UNITED STATES PATENT OFFICE.

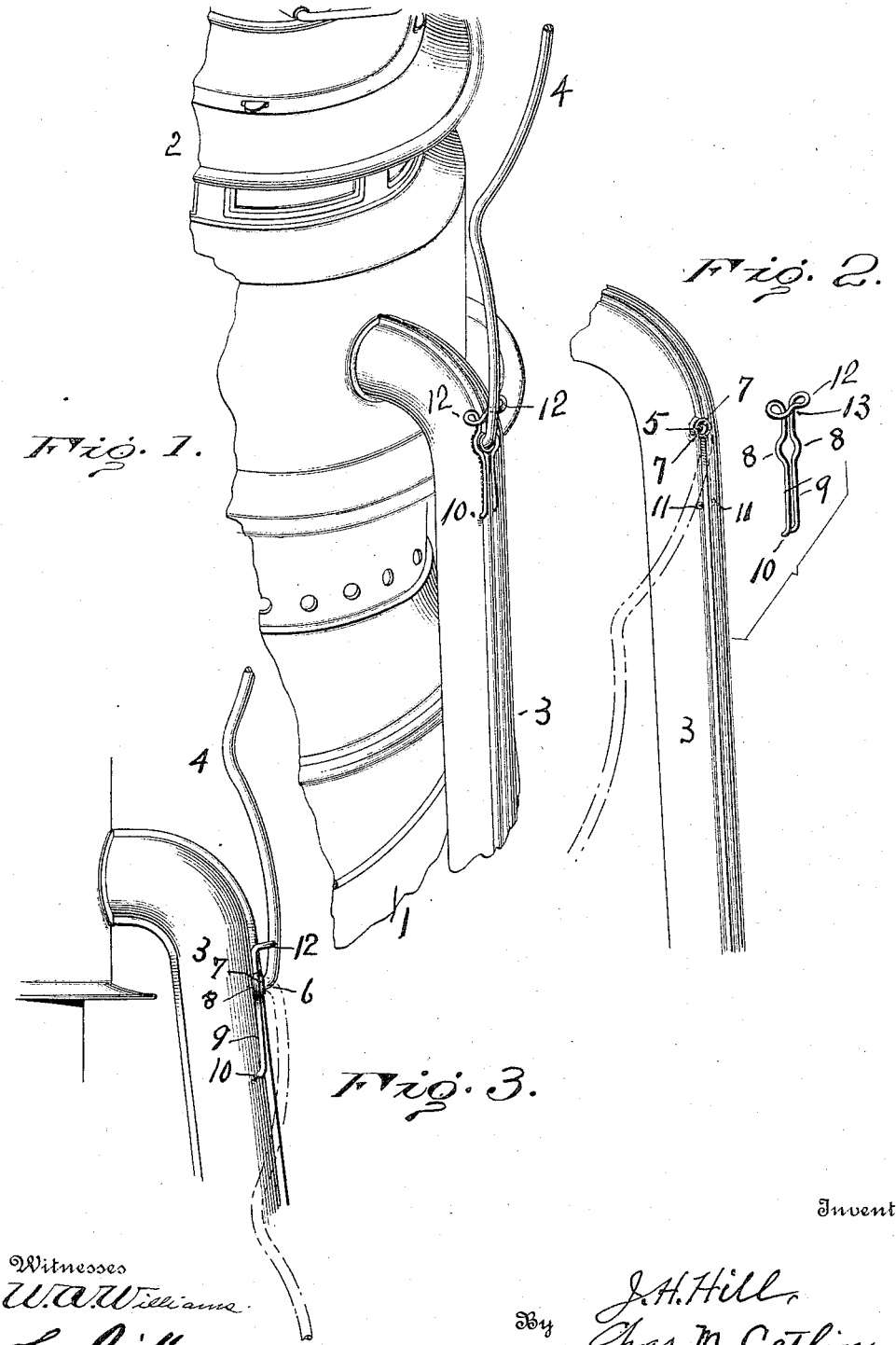

JAMES H. HILL, OF ROCHESTER, NEW YORK, ASSIGNOR TO EMBURY MANUFACTURING CO., OF WARSAW, NEW YORK, A CORPORATION.

LANTERN-BAIL HOLDER.

1,146,876.  Specification of Letters Patent.  Patented July 20, 1915.

Application filed May 9, 1914. Serial No. 837,438.

*To all whom it may concern:*

Be it known that I, JAMES H. HILL, a citizen of the United States, and a resident of Rochester, in the county of Monroe and State of New York, have invented certain new and useful Improvements in Lantern-Bail Holders; and I do hereby declare the following to be a full, clear, and exact description of the invention, such as will enable others skilled in the art to which it pertains to make and use the same.

The invention relates to bail or handle holders for tubular lanterns, the object of the invention being to provide a simple, strong and efficient improved device for holding such handles in vertical position, but in such manner as to be movable downward by application of a small force, when desired.

The invention consists in the construction hereinafter described and particularly pointed out in the claims.

In the accompanying drawing which illustrates the invention and forms part of the specification;—Figure 1 is a perspective view of a part of a tubular lantern with the improved holder thereon; Fig. 2 is a perspective view of a lantern side tube, and of the bail holder, detached. Fig. 3 is a partial side view showing the holder in use.

Numerals 1, 2 and 3 denote respectively the globe, top, and side tubes of a lantern, and 4 a pivoted bail or handle. In each side tube 3 (the near side tube only being shown) in its outer flanged side is a hole 5 to receive a bent end 6 of the handle. The metal of which the side tubes are made is bent outward around the holes, forming short ring flanges 7, against the outer sides of which the curved parts 8 of the wire holder are closely and firmly soldered. The straight parts 9 of the holder lie close to the tube flange on opposite sides, and are soldered in place. Preferably the extreme ends 10 are bent backward and when in place fit into holes or indentations 11 in the tube. The holder also has transversely extending parts 12, above the curved parts 8, and separated by a reëntrant bend 13, vertically above hole 5. The corresponding end of the handle is so shaped that when entered through the hole, and the handle is upright, the handle wire stands in the bend 13, with a part 12 at each side thus holding the handle up. The holder, shaped and arranged as described, strengthens the tube at the hole, and no separate eyelet or other separate reinforcing means is required.

The wire holder is simple, strong, and hardly noticeable on the lantern. A holder on one side tube only of a lantern would be operative but it is preferred to have one on each side tube. Evidently a part of the advantages of my improvement would be secured were the outward flanges around the holes 5 omitted.

What I claim and desire to secure by Letters Patent of the United States is;—

1. A tubular lantern side tube having a handle-end receiving hole therein, a handle, and a wire handle holder comprising curved parts passing around and close to the hole on opposite sides and there soldered firmly to the tube thereby being secured to the tube and also strengthening the tube at the hole, the holder having also transversely and outwardly extending parts separated by an inward bend situated above the hole, as and for the purpose described.

2. A tubular lantern side tube having a handle-end receiving hole therein with an integral outward flange on opposite sides of said hole, and a wire handle holder comprising curved parts soldered to the outer side of the flanges and to the tube thereby being secured to the tube and strengthening the tube at the hole, the holder having also transversely extending parts separated by an inward bend above the hole.

3. A lantern side tube having a handle-receiving hole therein, a wire handle holder comprising in one piece straight parts extending longitudinally of the tube and curved parts extending around and close to said hole, said straight and curved parts both being soldered in position on the tube, the curved parts thus strengthening the tube at the handle receiving hole, the holder having above the hole transverse handle holding extensions.

In testimony whereof, I have signed this specification in the presence of two subscribing witnesses.

JAMES H. HILL.

Witnesses:
EDWARD B. MORRIS,
W. C. EMBURY.

Copies of this patent may be obtained for five cents each, by addressing the "Commissioner of Patents, Washington, D. C."